Oct. 19, 1926.
E. MATTHEWS
1,603,702
VEHICLE SPRING
Filed May 1, 1923
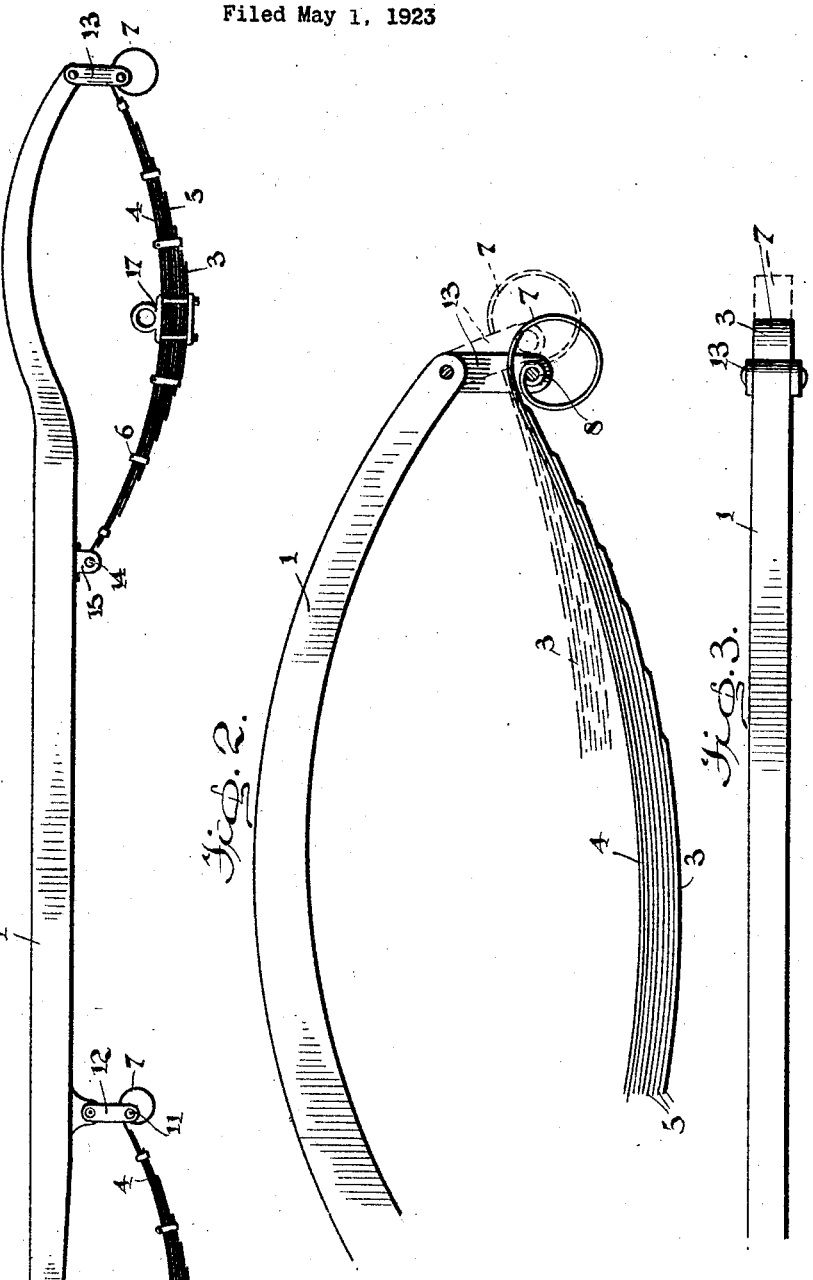
INVENTOR
Ed. Matthews,
BY
ATTORNEYS Patented Oct. 19, 1926.

1,603,702

UNITED STATES PATENT OFFICE.

ED MATTHEWS, OF DENVER, COLORADO, ASSIGNOR OF ONE-HALF TO WILLIAM P. TICHENOR, OF DENVER, COLORADO.

VEHICLE SPRING.

Application filed May 1, 1923. Serial No. 635,923.

This invention relates generally to vehicle springs, more particularly to springs of the semi-elliptic type of construction, such as is adapted to be incorporated in automobiles of various types, and it consists in the combinations, constructions and arrangements herein described and claimed.

An object of the invention is to provide a spring of the character described which affords facilities for resiliently supporting a body which is superimposed thereon so that the shocks and jars incident to the service for which it is intended will be effectually dissipated and absorbed without being transmitted to the supported body and with but relatively little wear on the springs.

A further object of the invention is to provide a spring of the character described which is adapted to effectively check rebound of the body supported thereon without causing any undue strain on the springs and without communicating any shock to the supported body.

A still further object of the invention is to provide a spring of the character described which is constructed in such manner that the area of the resilient portion thereof in a spring of a given size is relatively great.

Other objects and advantages will be apparent from the following description, considered in conjunction with the accompanying drawings, in which—

Figure 1 is a side elevation of a side frame member of an automobile equipped with front and rear springs embodying the invention, Figure 2 is a relatively enlarged fragmentary side elevation, showing a portion of the structure which is exhibited in Figure 1, and Figure 3 is a plan view of the structure shown in Figure 2.

Referring now to the drawings and particularly to Figure 1 thereof, 1 denotes an elongated frame or suspension member such as is adapted to be incorporated in or form a part of the body of an automobile and to extend longitudinally of the automobile body along one side thereof, as is usual. The frame member 1 has the end portions thereof provided with springs which in the present instance are of special construction and are designated 2 and 3, respectively.

The springs 2 and 3 are identical, one with the other, in essential respects and each comprises a main or uppermost leaf 4 and a plurality of secondary leaves 5 which vary in length according to their positions, the lowermost of the leaves 5 being the shortest. The main leaf 4 and the secondary leaves 5 of each of the springs 2 and 3 are held in superposed relation with respect to one another by any suitable known means, such as the clips indicated at 6 and are bent symmetrically so that each of the springs 2 and 3 is semi-elliptic in shape.

The end portions of the main leaf 4 extend beyond the corresponding ends of the proximate leaf 5 and one of such extending end portions of the main leaf 4 is considerably longer than the other end portion. The longer extending end portion of the main leaf of each of the springs 2 and 3 is bent reversely to the curvature of the body of the main leaf and of the spring as a whole into substantially circular form, thus providing a scroll-shaped loop 7 lying in the general plane of the spring and into which the extreme end portion of the relatively long extending end portion of the main leaf is bent and fashioned to provide an eye as indicated at 8 in Figure 2.

The shorter extending end portion of the main leaf of each of the springs 2 and 3 is formed to provide an eye 9.

From the foregoing description of the various parts of the device, the operation thereof may be readily understood. The spring 2 is the front spring in the construction shown in Figure 1 and the eye 9 thereof receives a pivot pin 10 whereby the spring 2 is pivotally connected at its forward end to the forward end of the frame member 1. The eye 8 at the rearward end of the spring 2 receives a bolt 11 forming a part of a shackle 12, whereby the spring 2 is swingingly attached at its rearward end of the frame member.

The eye 8 of the rear spring 3 is swingingly attached to the frame member 1 at the rear end of the latter by means of a shackle 13 and the eye 9 at the forward end of the rear spring receives a pivot pin carried by a bracket 15 secured to the frame member 1. The springs 2 and 3 are adapted for connection at points intermediate their length with the front and rear axles respectively and may be secured to the latter by any suitable known means, such as the bolt 16 carried by the spring 2 and the clip 17 provided for the rear spring 3.

The eye 8 within the scroll-like loop 7 of each spring is positioned in eccentric relation to the loop when the spring is not under a load and in vertical alignment with the shackle which connects the eye 8 to the frame member 1. When a load is placed on the spring, the eye 8 is forced downwardly within the scroll-like loop, thereby tending to roll up or close the latter while at the same time the spring is elongated and the supporting shackle is swung to an oblique position, all as shown by the dotted lines in Figures 2 and 3. When the load is removed from the spring after it has been elongated in the manner described, the eye 8 moves upward in the scroll-like loop, thereby unrolling or opening the latter and effectually checking rebound without causing any strain on the body portion of the spring.

Since the scroll-shaped loops at the rearward ends of the springs 2 and 3 cooperate with the bodies of such springs in absorbing and dissipating shocks and jars, it will be manifest that the leaves of such springs are not so likely to be broken in the service for which they are intended as the leaves of a spring of ordinary construction.

Obviously, my invention is susceptible of embodiment in forms other than that illustrated in the accompanying drawing, and I therefore consider as my own all modifications and adaptations of the form of the device herein disclosed which fairly fall within the scope of the appended claims.

Having thus described the invention, what is claimed is:—

1. In a vehicle spring, a spring leaf bent adjacent to one end to provide a scroll-like loop of substantially circular configuration, the extremity of said one end portion terminating within the loop in an eye eccentric to the loop, the axis of said eye being parallel to the axis of the loop, means for pivotally attaching said leaf at its other end to the frame of the vehicle for swinging movement about an axis parallel to both the axis of the eye and the axis of the looop at the first named end of the leaf, and a shackle pivotally attachable to the vehicle frame and including a swingingly supported bolt adapted to extend through the eye which is within said loop of the leaf to pivotally attach said shackle to said eye.

2. In a vehicle spring, a spring leaf bent adjacent to one end to provide a scroll-like loop of substantially circular configuration, the extremity of said one end portion terminating within the loop in an eye eccentric to the loop, the axis of said eye being parallel to the axis of the loop, means for pivotally attaching said leaf at its other end to the frame of the vehicle for swinging movement about an axis parallel to both the axis of the eye and the axis of the loop at the first named end of the leaf, and a shackle pivotally attachable to the vehicle frame and including a swingingly supported bolt adapted to extend through the eye which is within said loop of the leaf to pivotally attach said shackle to said eye, said spring leaf being semi-elliptic in shape and said loop at one end of the leaf being curved reversely to the general curvature of the leaf.

ED MATTHEWS.